United States Patent [19]

McFarlane

[11] Patent Number: 5,245,623
[45] Date of Patent: Sep. 14, 1993

[54] INFRARED-TO-VISIBLE UPCONVERSION DISPLAY SYSTEM AND METHOD OPERABLE AT ROOM TEMPERATURE

[75] Inventor: Ross A. McFarlane, Thousand Oaks, Calif.

[73] Assignee: Hughes Aircraft Company, Los Angeles, Calif.

[21] Appl. No.: 801,317

[22] Filed: Dec. 2, 1991

[51] Int. Cl.$^5$ ............................................. H01S 3/09
[52] U.S. Cl. ...................................... 372/69; 372/41; 372/75; 372/34; 372/99; 372/70
[58] Field of Search ................... 372/69, 41, 75, 20, 372/23, 70, 39, 99, 92, 34

[56] References Cited

U.S. PATENT DOCUMENTS

| | | | |
|---|---|---|---|
| 4,477,906 | 10/1984 | Case | 372/70 |
| 4,949,348 | 8/1990 | Nguyen et al. | 372/41 |
| 5,008,890 | 4/1991 | McFarlane | 372/41 |
| 5,022,040 | 6/1991 | Pollack et al. | 372/41 |
| 5,038,358 | 8/1991 | Rand | 372/41 |
| 5,086,432 | 2/1992 | Esterowitz et al. | 372/41 |

OTHER PUBLICATIONS

Chemical Physics Letters, vol. 167, No. 5, Apr. 6, 1990, Netherlands, pp. 471-474, G. L. McPherson et al., "Dynamics of up-conversion for photoexcited pairs of Er3+ ions in CsCdBr3 crystals".
Nguyen et al., "Blue Upconversion Thulium Laser", SPIE vol. 1223—Solid State Lasers, 1990, pp. 54-63.
Herbert et al., "Visible CW-Pumped Upconversion Lasers", Proc. International Conference on Lasers '90, Dec. 1990, pp. 386-393.
Cockroft et al., "Upconversion Fluorescence Spectroscopy of ER$^{3+}$ Pairs in CsCdBr$_3$", Journal of Luminescence, vol. 43, 1989, pp. 275-281.
Cockroft et al., "Dynamics and Spectroscopy of Infra-Red to Visible Upconversion in Erbium Doped Cesium Cadmium Bromide (CsCdBr$_3$:Er$^{3+}$)", submitted to Physical Review B, Apr. 16, 1991.
Pilla et al., "Comparative Raman Study of Phonon Linewidths in Pure and Lead-Doped CsCdBr$_3$", Phys. Stat. Sol., vol. 144, 1987, pp. 845-851.

Primary Examiner—Georgia Y. Epps
Attorney, Agent, or Firm—V. D. Duraiswamy; W. K. Denson-Low

[57] ABSTRACT

An upconversion system and method for producing red, green and/or blue emissions in response to an infrared pump is operable at room temperatures. Implemented either as a laser or as phosphors, the host medium has a hexagonal CsNiCl$_3$-type crystal structure, a phonon wave number less than 200 cm$^{-1}$, and a rare earth dopant occupying paired lattice vacancies. The host medium has the formulation AMX$_3$, where A is a monovalent metal, M is a divalent metal and X is a halogen; the system has been demonstrated with CsCdBr$_3$:Er. Green, blue and red emissions are stimulated with infrared pumps of about 800 nm, 980 nm and simultaneous 800/980 nm, respectively.

14 Claims, 4 Drawing Sheets

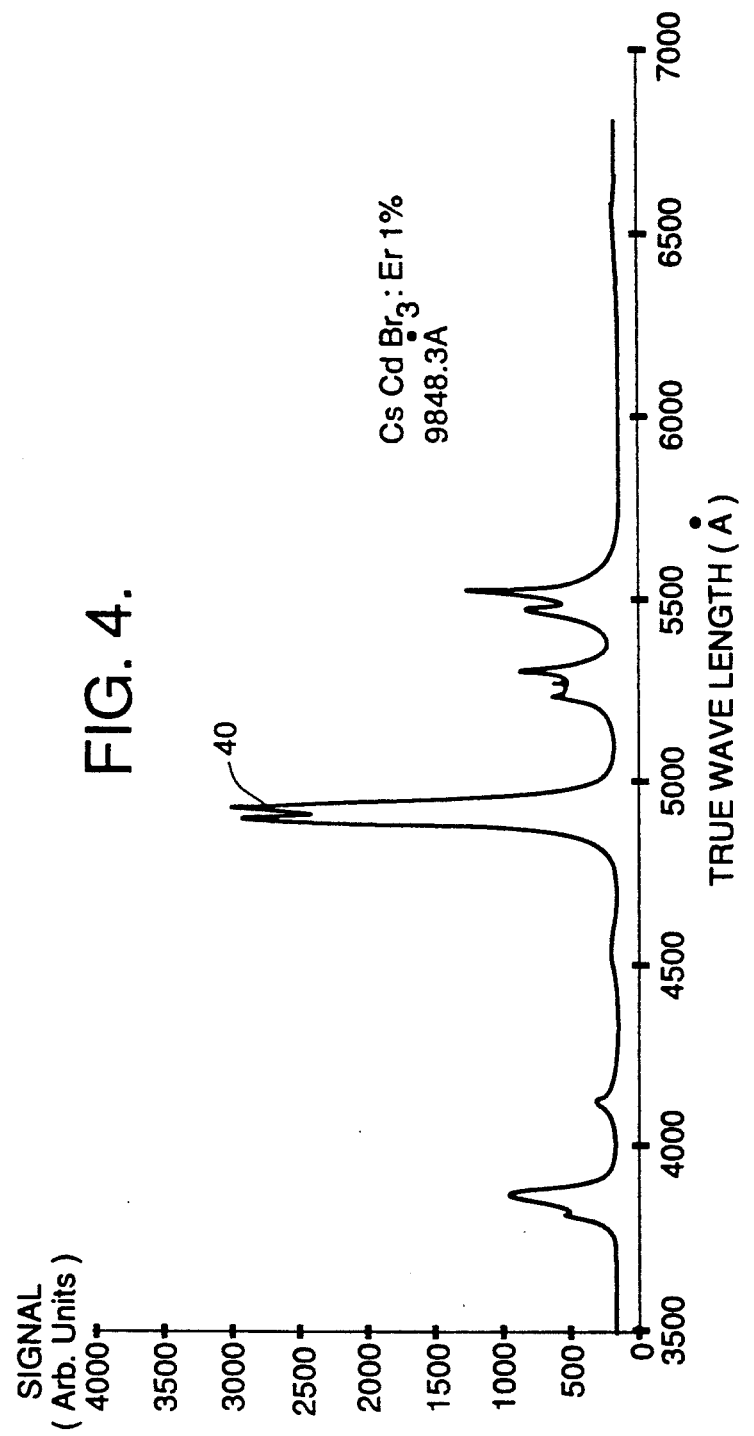

INFRARED-TO-VISIBLE UPCONVERSION DISPLAY SYSTEM AND METHOD OPERABLE AT ROOM TEMPERATURE

BACKGROUND OF THE INVENTION

1. Field of the Invention

This invention relates to upconversion systems and methods for stimulating a visible output from a laser or phosphor with an infrared input.

2. Description of the Related Art

Phosphors and other upconversion systems are important in display technology for television, radar, CRT, and instrumentation panels. The conventional television screen, for example, uses a screen coated with three different phosphors, typically corresponding to red, green and blue, and addressed by an electron beam. The electron beam generation apparatus is complicated and expensive, and the requirement for three separate types of phosphors adds to the overall complexity and cost.

Other upconversion mechanisms that convert infrared radiation to visible radiation have been known for many years in the field of phosphors. These upconversion systems emit visible radiation in response to an infrared pump beam, with the visible output considerably amplified with respect to the infrared input. They have been a topic of particular interest since the advent of inexpensive and high efficiency infrared diode lasers capable of providing the required pump beam to replace the costly electron beam generating apparatus.

A full color upconversion laser that is pumped by a single wavelength infrared source is discussed in U.S. Pat. No. 5,008,890 to McFarlane, "Red, Green, Blue Upconversion Laser Pumped by Single Wavelength Infrared Laser Source" and assigned to Hughes Aircraft Company, the assignee of the present invention. The laser employs a crystal of $YLiF_4:Er5\%$, and is operated at a cryogenic temperature between 15° and 120° K. Most other investigations of upconversion lasers have similarly involved fluoride-based materials that required large scale cooling, e.g., Nguyen et al., "Blue Upconversion Thulium Laser", *SPIE* Vol. 1223-Solid State Lasers, 1990, pp. 54–63, and Hebert et al., "Visible CW-Pumped Upconversion Lasers", *Proc. International Conference on Lasers '90*, December 1990, pp. 386–393.

Investigations have been conducted to characterize the upconversion spectroscopic properties of erbium (Er) doped cesium cadmium bromide ($CsCdBr_3$) crystals by Cockroft et al., in "Upconversion Fluorescence Spectroscopy of $Er^{3+}$ Pairs in $CsCdBr_3$", *Journal of Luminescence*, Vol. 43, 1989, pp. 275–281 and in "Dynamics and Spectroscopy of Infra-Red to Visible Upconversion in Erbium Doped Cesium Cadmium Bromide ($CsCdBr_3:Er^{3+}$)", submitted to *Physical Review B*, Apr. 16, 1991. It was noted that an 804 nm wavelength infrared pump beam produced an emission peak at 414 nm, a 984 nm pump beam produced an emission peak at 493 nm, and that simultaneous 804 nm and 984 nm excitation gave strong emissions at 455 nm, 651 nm and 671 nm. Moreover, these investigations were conducted by pulse pumping the $CsCdBr_3:Er^{3+}$ crystal at cryogenic temperatures ranging from 10°–40° K., as dictated by the state-of-the-art. Cockroft et al. are silent with respect to an upconversion laser system incorporating the $CsCdBr_3:Er^{3+}$ crystal, and with respect to such a laser system or an upconversion phosphor being operable above cryogenic temperatures.

In general, the operation of an infrared upconversion system has been restricted to less than 140° K. to reduce multiphonon relaxation of ion energy levels that are populated by the energy pooling of pumped ion pairs, and thus retain proper upper energy state laser populations. The requirement for cryogenic cooling to achieve upconversion characteristics in a laser system is known to significantly complicate the system, adding to its weight, bulk and expense. Therefore, there is a need for robust upconversion laser systems and phosphors which are operable above cryogenic temperatures to greatly expand the display application areas of the technology.

SUMMARY OF THE INVENTION

The present invention seeks to provide a new type of upconversion system that makes possible the generation of a laser beam at various colors within the visible spectrum in response to an infrared pump beam, operating at room temperature without the prior requirement for a cryogenic environment. It also seeks to provide a multicolor phosphor display with only one type of phosphor material, and which again is operable at room temperature.

These goals are achieved with the use of a crystalline host medium that has a phonon wave number less than $200 \text{ cm}^{-1}$, and rare earth dopant ion pairs in proximity to a vacancy. It can be implemented as either a lasing medium or a phosphor. The host medium has a hexagonal $CsNiCl_3$-type crystal structure with the formulation $AMX_3$, where A is a monovalent metal, M is a divalent metal and X is a halogen. The display system is operable at room temperatures, and in general at temperatures in excess of 140° K. A demonstrated formulation is $CsCdBr_3:Er$, with a dopant concentration of about 0.1–1%.

These and other features and advantages of the invention will be apparent to those skilled in the art from the following detailed description, taken together with the accompanying drawings, in which:

DESCRIPTION OF THE DRAWINGS

FIGS. 3 and 4 are spectral graphs showing the visible room temperature emissions obtained by the invention having infrared pump beams with wavelengths of 8065.8 Angstroms and 9848.3 Angstroms, respectively;

FIGS. 5a, 5b and 5c are quantum energy diagrams illustrating the energy pooling process employed by invention, and;

DETAILED DESCRIPTION OF THE INVENTION

The invention makes possible an upconversion system that emits visible light in response to an infrared input pump, and is operable at temperatures in excess of 140° K. and all the way up through room temperature. This eliminate the previous need for a cooling system, and thus considerably reduces the complexity, cost, weight and bulk of the overall system.

It has been discovered that these results can be obtained by stimulating a crystalline host medium that has a hexagonal CsNiCl$_3$-type crystal structure, and is doped with a rare earth metal. Hexagonal CsNiCl$_3$ defines a general class of crystal structure with the formulation AMX$_3$, where A is a monovalent metal such as Cs, Na or K, M is a divalent metal such as Ni, Mn, Mg or Cd, and X is a halogen such as Cl, Br or F. The crystal is doped with a rare earth dopant such as Ce, Nd, Tb, Er, Pr, Pm, Sm, Eu, Gd, Dy, Ho, Tm or Yb, so long as the dopant ion size is compatible with that of the host.

The CsNiCl$_3$-type structure consists of linear chains of face-sharing (CdBr$_6$)$^{4-}$ octahedra, arranged along the crystallographic c-axis. As a natural consequence of the crystal structure, dopant impurities such as the Er$^{3+}$ ion substitutionally replace the divalent metal ion, such as Cd$^{2+}$, in the lattice. Electrical neutrality requires that 2 Er ions replace 3 Cd ions; this is accomplished by a sequence Er$^{3+}$:vacancy:Er$^{3+}$. As a result two Er ions are placed in much closer proximity to each other than is achieved with the random distribution that obtains in other host materials used previously.

A consequence of this crystal structure is that it exhibits a low phonon energy relative to the quantum gaps between successive excited states when the crystal is doped. The phonon wave number is less than 200 cm$^{-1}$. A "phonon" is related to the thermal energy of a solid material, which is contained in certain combinations of particle vibrations that are equivalent to standing elastic waves, and are referred to as normal modes. Each normal mode contains a number of discrete quanta of energy called phonons. Phonons are considered only as particles, each having an energy, a momentum and a velocity. In a manner analogous to the energy levels of electrons in a solid, phonons can have only certain discrete allowed energies. The phonon wave number is a measure of phonon energy; a low phonon wave number corresponds to a low phonon energy. The phonon wave numbers for the hexagonal CsNiCl$_3$-type crystal structure are quite low; the phonon wave number for the demonstrated material CsCdBr$_3$:Er is about 160 cm$^{-1}$, as compared with a wave number on the order of 500 cm$^{-1}$ for the YLiF$_4$:Er crystal employed in U.S. Pat. No. 5,008,890. The significance of the low phonon wave number as an explanation of the unexpected visible emissions achieved with the invention at room temperature operation are discussed later.

Figure 1:
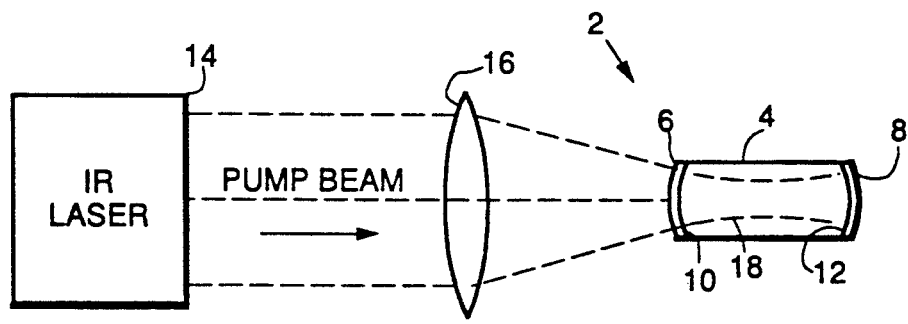
FIG. 1 is a block diagram of laser upconversion apparatus suitable for practicing the invention.

A simplified block diagram of an upconversion laser that embodies the invention is given in FIG. 1. The laser 2 consists of a laser crystal rod 4 of the doped AMX$_3$ material described above, such as CsCdBr$_3$:Er, fabricated in a monolithic structure that includes laser mirrors 6 and 8 as dielectric coatings on spherical surfaces 10 and 12 at opposite ends of the rod 4. The mirrors 6 and 8 are optically reflecting at one or more of the desired output wavelengths. The dopant concentration will generally range from about 0.1% to about 1%.

Pump energy is preferably supplied by a semiconductor diode infrared laser 14. Other laser sources, such as a dye laser or titanium sapphire laser, could also be used, although semiconductor diode lasers are preferred because of their high electrical efficiency and low cost. A nonlaser infrared source could conceivably also be used, but is not practical at present because of high inefficiencies in obtaining the required power concentration. The pump beam is directed through the laser mirror 6, which is specifically designed to be simultaneously highly reflective at the laser wavelengths and highly transmissive at the pump wavelength. To enhance efficiency, a lens 16 is placed in the pump beam path to focus the pump beam so as to provide a match between the laser mode size and the pumped region of the crystal 4. The internal laser mode is indicated by dashed lines 18. The laser mirror 8 is fabricated to have a transmissivity in the range of about 1%–10% at the upconversion wavelengths, and thereby provides a mechanism for outputting a laser beam from the crystal 4.

The laser crystal 4 is generally about 5 mm long. Its diameter should exceed that of the optical mode, and will generally be about 200–5,000 microns. The pump laser 14 is operated in a continuous wave (CW) mode with a pump power of from about 10 mW to several hundred mW.

Figure 2:
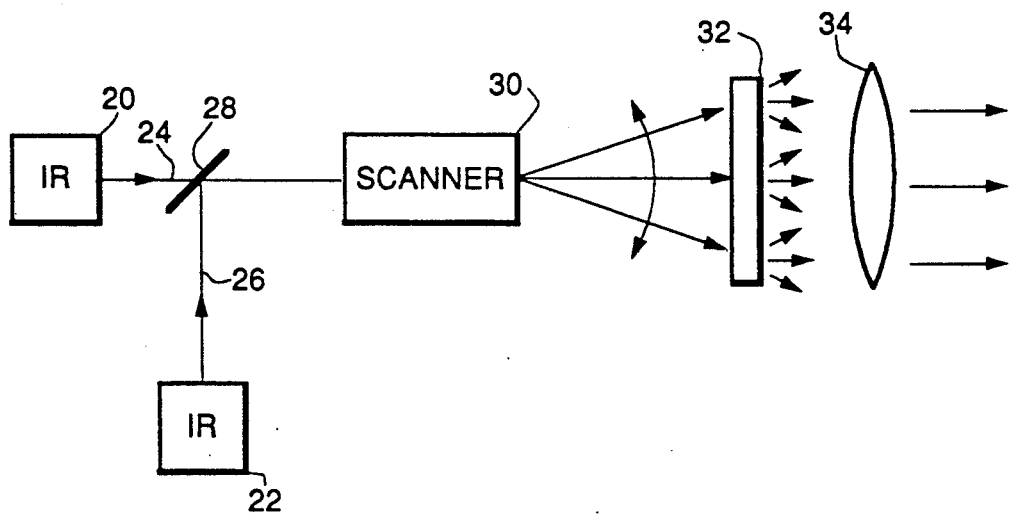
FIG. 2 is a block diagram of a phosphor display system suitable for practicing the invention.

When used in a non-laser application, the same type of crystals as described above can provide a room temperature replacement for electron beam pumped phosphors in display applications, when pumped with an infrared beam. This type of display system is illustrated in FIG. 2. A pair of infrared pump lasers 20 and 22 are employed, with the first laser 20 producing a pump beam 24 at about 800 nm and the other laser 22 producing a pump beam 26 at about 980 nm. The two beams are combined by a dichroic mirror 28 and directed by a scanner 30 in a scanning motion across a screen 32 that is coated with a dispersion of polycrystalline phosphors of the same material used for the laser described above. This results in blue, green and red emissions that are collimated by a lens 34 and transmitted to a display screen or directly to the viewer. Again, the system is fully operable at room temperature.

Figure 3:
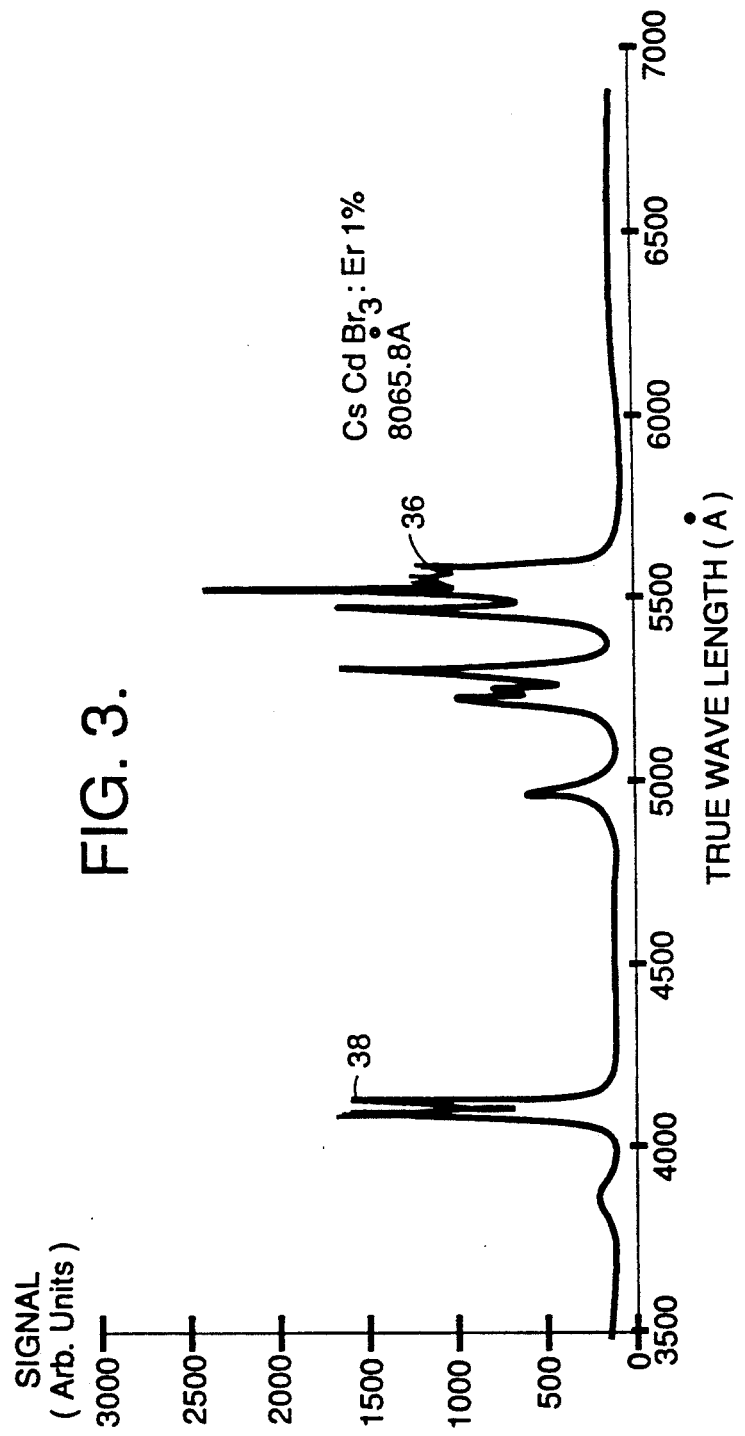

The room temperature upconversion responses of the described crystals pump beams with wavelengths of 8,065.8 Angstroms and 9,848.3 Angstroms are shown in FIGS. 3 and 4, respectively. A CsCdBr$_3$:Er1% crystal was used. As shown in FIG. 3, with the 8,065.8 nm pump the crystals produced a substantial radiation emission shoulder at about 5,600 Angstroms, which corresponds to a green output. Outputs were also produced at other portions of the visible spectrum, including a response 38 at about 4,100 Angstroms, corresponding to purple.

With a pump wavelength of 9,848.3 Angstroms (FIG. 4), the crystal's strongest spectral response 40 was centered on about 4,900 Angstroms, corresponding to a blue emission. This response was entirely missing with the prior cryogenic fluoride-based systems. A red response can also be obtained from a dual wavelength pump, such as the dual laser pump system illustrated in FIG. 2, at about 800 nm and 980 nm. Thus, a three-color red/green/blue image can be obtained with a single phosphor or laser crystal.

Figure 5A:
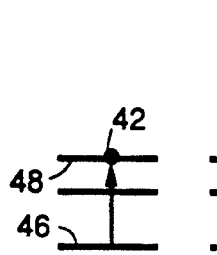
Figure 5B:
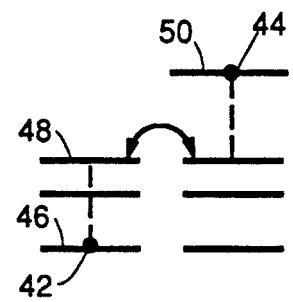
Figure 5B:
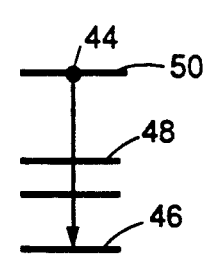

The upconversion mechanism by which a pump beam at an infrared wavelength produces an emission of visible light at a wavelength shorter than the excitation wavelength is illustrated in FIGS. 5a–5c. With a hexagonal CsNiCl$_3$-type crystal structure, rare earth dopant ions enter the crystal at adjacent locations that are separated by a vacancy, rather than being randomly dispersed in the host crystal. The paired dopant ions exhibit a strong, efficient energy sharing. As illustrated in FIG. 5a, a pair of adjacent ions 42 and 44 are initially excited from a ground state 46 into a common higher energy level 48. An energy pooling then occurs between the paired ions, with one ion 42 transferring its energy to the adjacent ion 44 (FIG. 5b). Ion 42 falls back to the ground state 46, while ion 44 advances to a higher energy level 50. If the energy of excited ion 44 now drops all the way from elevated energy level 50 to ground state 46, an emission is produced at a shorter wavelength than that of the pump initially used to excite the ions up to level 48. The energy pooling that is required for upconversion is believed to be substantially more efficient with the crystal material of the present invention, due to the replacement of the dipole-dipole interaction between ions in a random distribution by an interaction which is due to superexchange between paired ions.

It is also possible to dope the host medium with more than one type of dopant. For example, if both ytterbium and erbium are used as dopants, the ytterbium tends to absorb the pump radiation more efficiently and to convey this added energy to the erbium. Thulium and praseodymium exhibit a similar energy absorption and conveyance.

Figure 6:
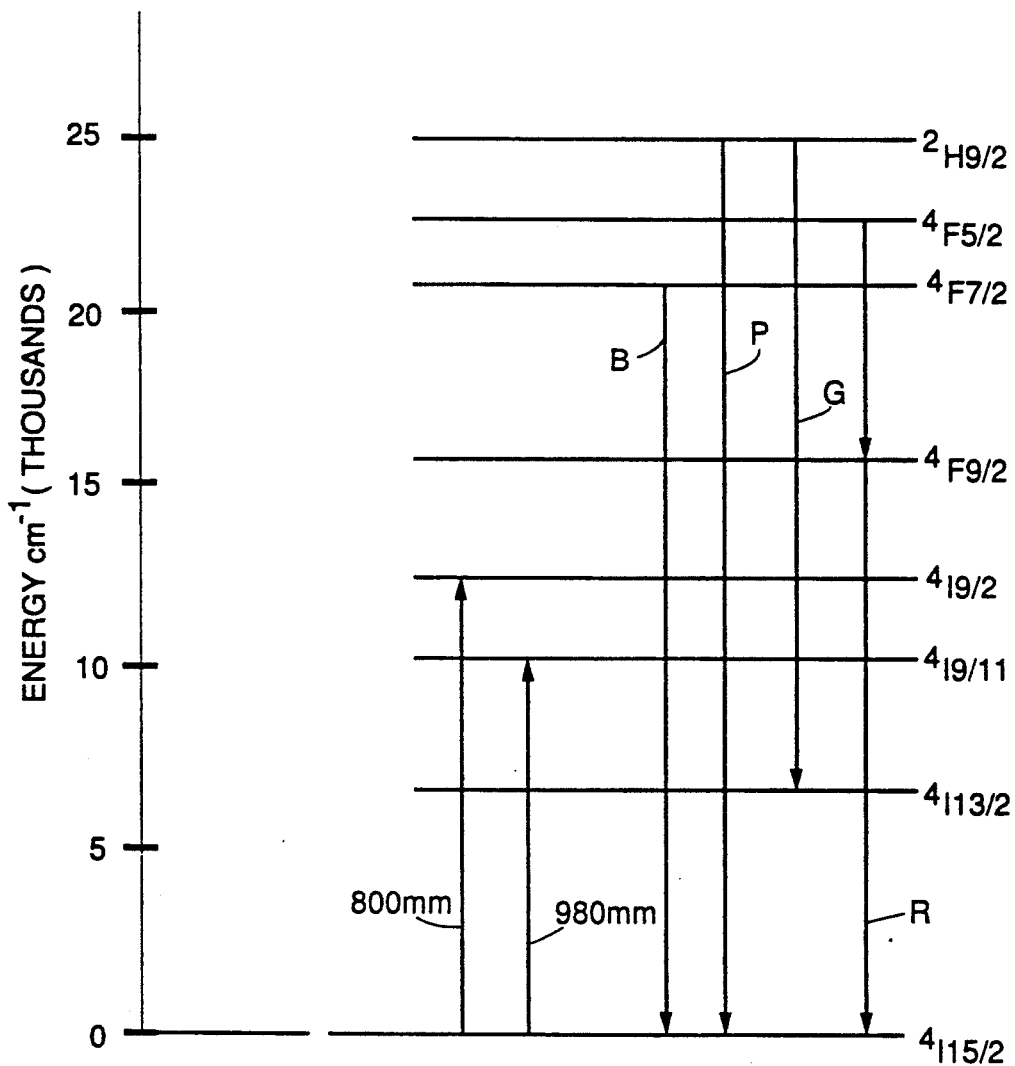
FIG. 6 is a quantum energy diagram illustrating the laser transitions and pumping pathways exhibited by the invention.

FIG. 6 is an energy diagram that represents an attempt to explain the room temperature generation of green, blue and red emissions achieved with the invention in a demonstration that employed $CsCdBr_3$:Er. In general, excited ions can return to a ground state by emitting radiation, by generating phonons, or by a combination of the two processes. The probability of generating phonons rather than emitting radiation increases exponentially with phonon size. Since the hexagonal $CsNiCl_3$-type crystal structure exhibits phonon wave numbers less than 200 $cm^{-1}$, as opposed to phonon wave numbers on the order of 500 $cm^{-1}$ for prior fluoride-based hosts, it is postulated that a larger number of phonons must be generated by the $CsNiCl_3$-type crystal to give off energy in the form of phonons between any two given quantum energy levels, compared to the fluoride-based material. Thus, there is a considerably stronger tendency for excited ions in the $CsNiCl_3$-type crystal to emit radiation rather than generate phonons between a pair of energy levels. A study of phonon linewidths in $CsCdBr_3$ at temperatures from 4.2°–300° K. has been reported in Pilla et al., "Comparative Raman Study of Phonon Linewidths in Pure and Lead-Doped $CsCdBr_3$", *Phys.Stat.Sol.*, Vol. 144, 1987, pp. 845–851.

The visible emission phenomenon is demonstrated in FIG. 6 by the process that results in a blue (B) radiation emission. With a pump beam of about 980 nm, Er dopant ions in $CsCdBr_3$ are initially elevated from the $^4I_{15/2}$ energy level (which can be considered as a ground state) to the $^4I_{11/2}$ level. Through energy pooling between paired ions, one of the ions returns to the ground state while the energy of the other ion is boosted to the $^4F_{7/2}$ level. From this level, and operating at room temperature, the ions emit radiation until they fall all the way back to the ground state. This radiation emission corresponds to spectral emission 40 at about 4,900 Angstroms in FIG. 4. No such emission is obtained from the prior fluoride-based hosts, even at cryogenic temperatures, indicating that phonon generation takes place with the fluoride-based hosts that prevents a visible radiation emission all the way from the $^4F_{7/2}$ level to the ground state; phonons are generated too fast for photon emission to occur.

A green (G) emission results from pumping at about 800 nm. The dopant ions are initially elevated to the $^4I_{9/2}$ level, with one of the paired ions falling back to ground state and the other ion increasing in energy to the $^2H_{9/2}$ level. From this level emissions occur both to the $^4I_{13/2}$ level, and all the way to the ground state. The first emission corresponds to spectral feature 36 in FIG. 3 at a green wavelength of about 5,600 Angstroms, while the second corresponds to spectral feature 38 at a purple wavelength of about 4,100 Angstroms. Since some of the ions pumped to the $^2H_{9/2}$ level thus terminate at the $^4I_{13/2}$ level rather than the ground state, less input pump power is required.

When the crystal is pumped with beams at about 800 nm and 980 nm simultaneously, ions are excited to the $^4I_{11/2}$ and $^4I_{9/2}$ levels, and pair to boost some of the ions to the $^4F_{5/2}$ level. From this level some of the ions drop to the $^4I_{13/2}$ level, while others drop to the $^4F_{9/2}$ level and from there to the ground state. The drop in energy from the $^4F_{9/2}$ level to the ground state results in an emission of red (R) light.

A red emission has previously been found for simultaneous 800 nm and 980 nm excitation, but only at a cryogenic temperature of 10° K. However, neither red nor red/green/blue emissions have previously been suggested or proposed with room temperature operation. By expanding the upconversion process to room temperature, the invention significantly reduces the overall cost, weight and size of the required apparatus.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A phosphor that emits visible radiation in response to infrared stimulation at temperatures substantially in excess of 140° K., comprising:
   a crystalline host medium having a hexagonal crystal structure with the formulation $AMX_2$, wherein A is a monovalent metal, M is a divalent metal and X is a halogen and
   a rare earth dopant replacing said divalent metal M within the lattice structure of said host medium.

2. The phosphor of claim 1, wherein said hexagonal crystal structure of said host medium is a $CsNiCl_3$-type crystal structure comprising $CsCdBr_3$.

3. The phosphor of claim 2, wherein said dopant comprises Er.

4. A system for generating visible radiation, comprising:
   a crystalline host medium having a phonon wave number less than 200 $cm^{-1}$,
   rare earth dopant ion pairs in proximity to respective vacancies within said host medium, and
   means for exciting dopant ions within said medium with infrared radiation stimulation at a temperature substantially in excess of 140° K., the wavelength of said infrared stimulation being selected to stimulate the emission of visible radiation from said medium.

5. The system of claim 4, said crystalline medium comprising a phosphor for dispersing visible radiation in response to said infrared stimulation.

6. The system of claim 4, said crystalline medium functioning as a lasing medium to emit a collimated visible beam in response to pumping by an infrared laser beam, further comprising means for coupling a pump infrared laser beam into said lasing medium, and means for reflecting visible radiation generated by said lasing medium in response to a pump laser beam in repeated passes through the lasing medium to establish a visible output beam from said lasing medium.

7. A method of generating visible radiation, comprising:

providing a crystalline host medium having a phonon wave number substantially less than 200 cm$^{-1}$ and doped with rare earth dopant ion pairs in proximity to respective vacancies within said host medium, and directing infrared radiation into said medium at a temperature substantially in excess of 140° to stimulate dopant ions in said medium to higher energy states, the wavelength of said infrared radiation being selected to stimulate the emission of visible radiation from said medium.

8. The method of claim 7, wherein said upconversion medium is stimulated with infrared radiation at room temperature.

9. The method of claim 7, wherein said host medium comprises $CsCdBr_3$.

10. The method of claim 9, wherein said rare earth dopant comprises Er.

11. The method of claim 7, wherein said infrared radiation has a wavelength of about 800 nm, and stimulates a green emission from said upconversion medium.

12. The method of claim 7, wherein said infrared radiation has a wavelength of about 980 nm, and stimulates a blue emission from said upconversion medium.

13. The method of claim 7, wherein said infrared radiation has dual wavelengths of about 800 nm and about 980 nm, and stimulates a red emission from said upconversion medium.

14. The method of claim 17 wherein said infrared radiation is an infrared laser pump beam and the visible radiation generated by said medium in response to said infrared radiation is reflected through the medium repeatedly to establish a visible laser beam.

* * * * *